C. JENSEN.
DRIVE MECHANISM.
APPLICATION FILED NOV. 27, 1908.
930,861.
Patented Aug. 10, 1909.
4 SHEETS—SHEET 1.
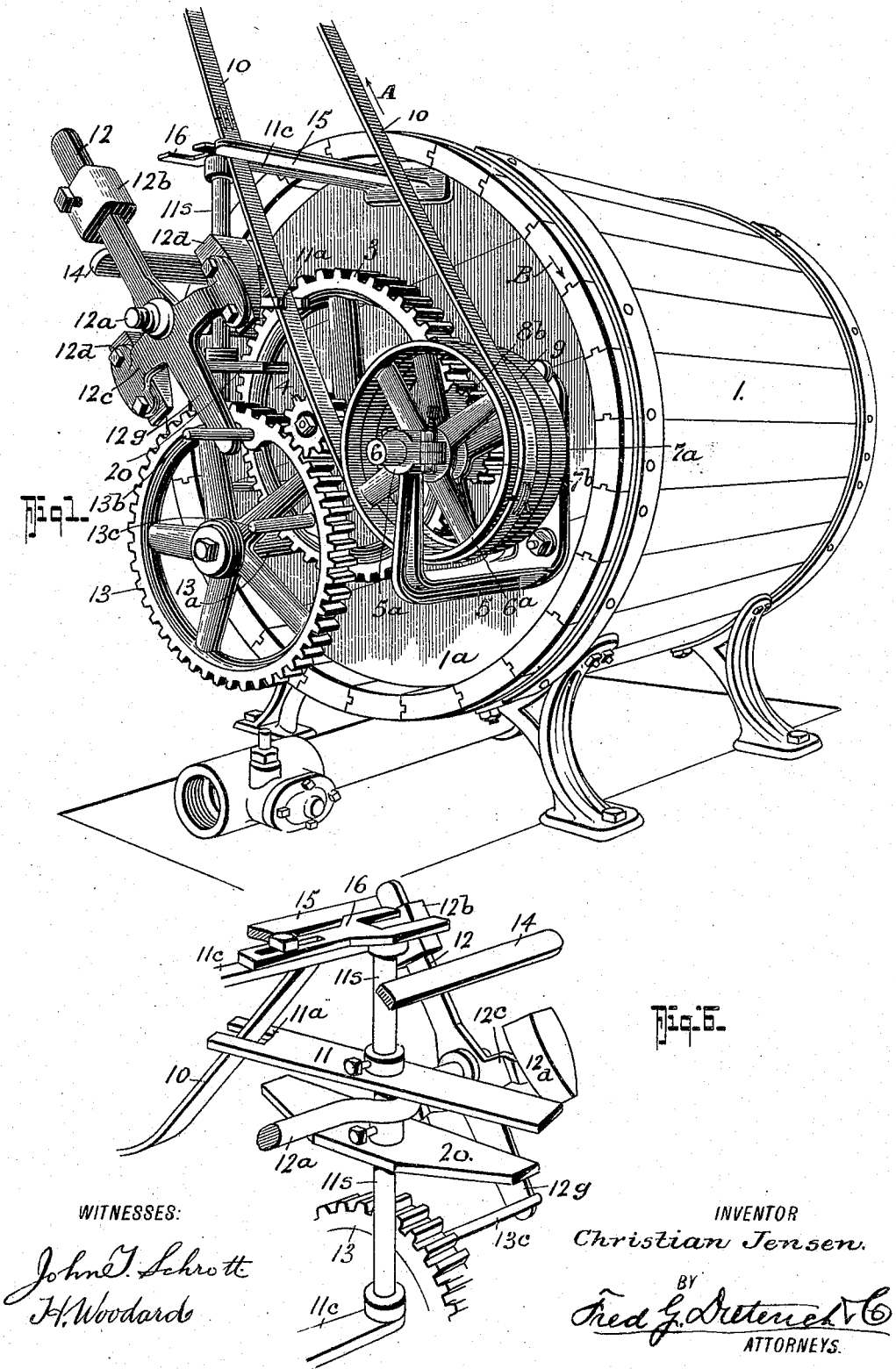
WITNESSES:
John T. Schrott
H. Woodard
INVENTOR
Christian Jensen.
BY
Fred G. Dieterich
ATTORNEYS.

C. JENSEN.
DRIVE MECHANISM.
APPLICATION FILED NOV. 27, 1908.
930,861.
Patented Aug. 10, 1909.
4 SHEETS—SHEET 2.
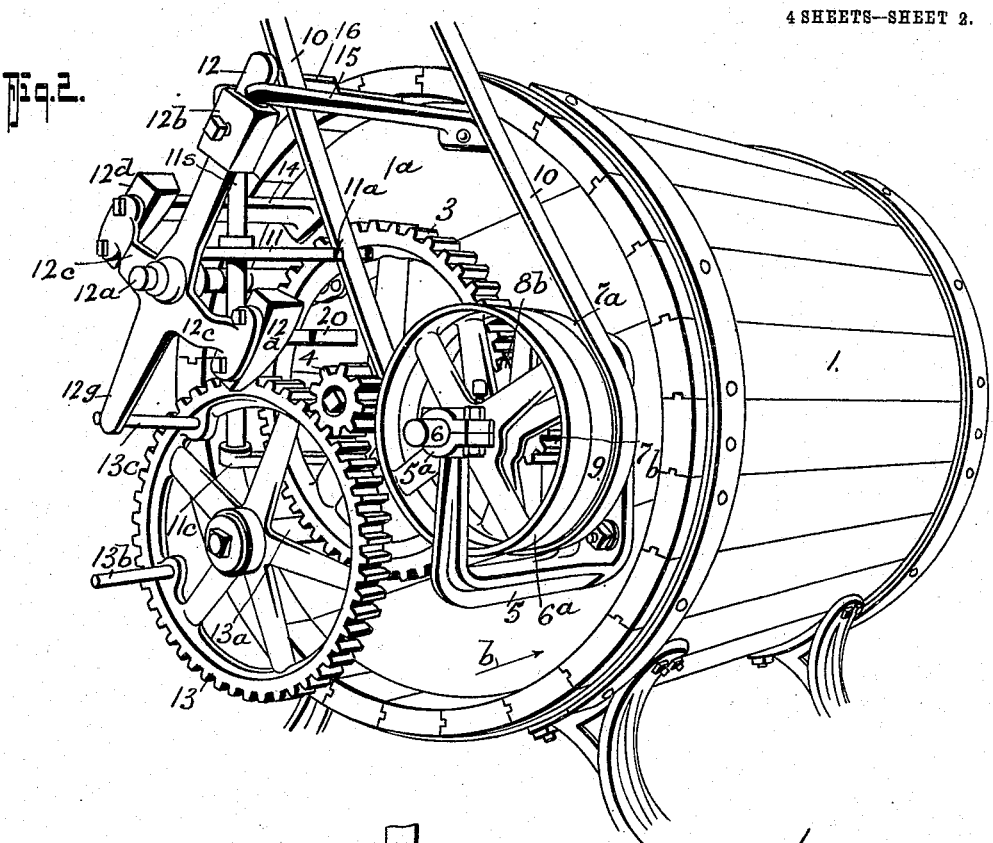
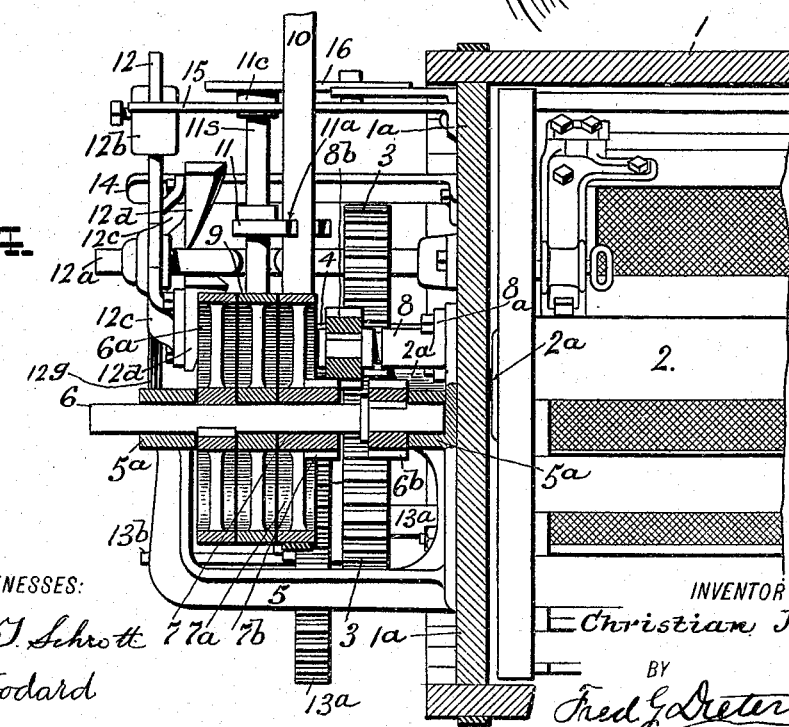
WITNESSES:
John T. Schrott
H. Woodard
INVENTOR
Christian Jensen.
BY
Fred G. Dieterich
ATTORNEYS.

C. JENSEN.
DRIVE MECHANISM.
APPLICATION FILED NOV. 27, 1908.
930,861.
Patented Aug. 10, 1909.
4 SHEETS—SHEET 3.
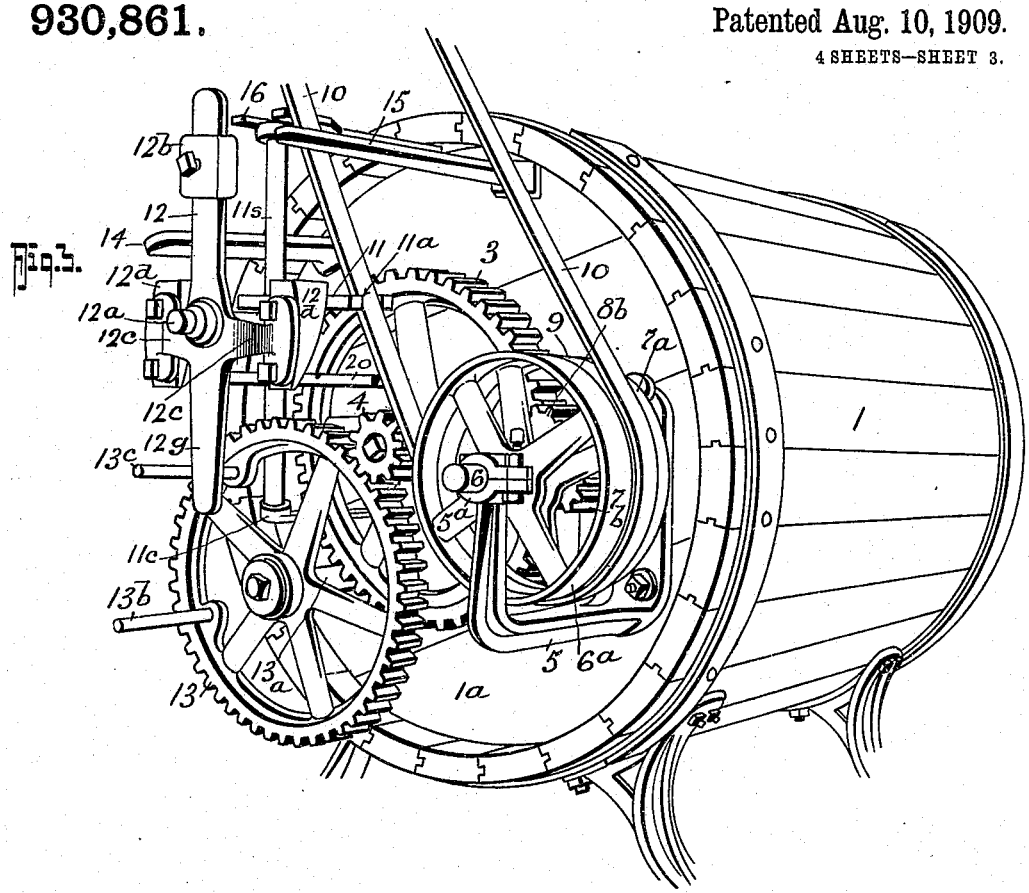
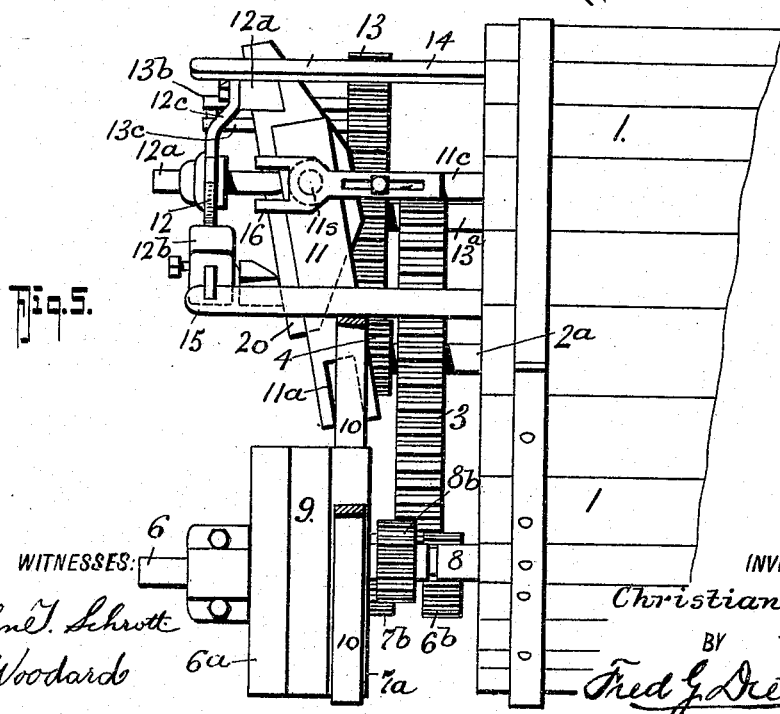
WITNESSES:
John T. Schrott
H. Woodard
INVENTOR
Christian Jensen.
BY
Fred G. Dieterich
ATTORNEYS.

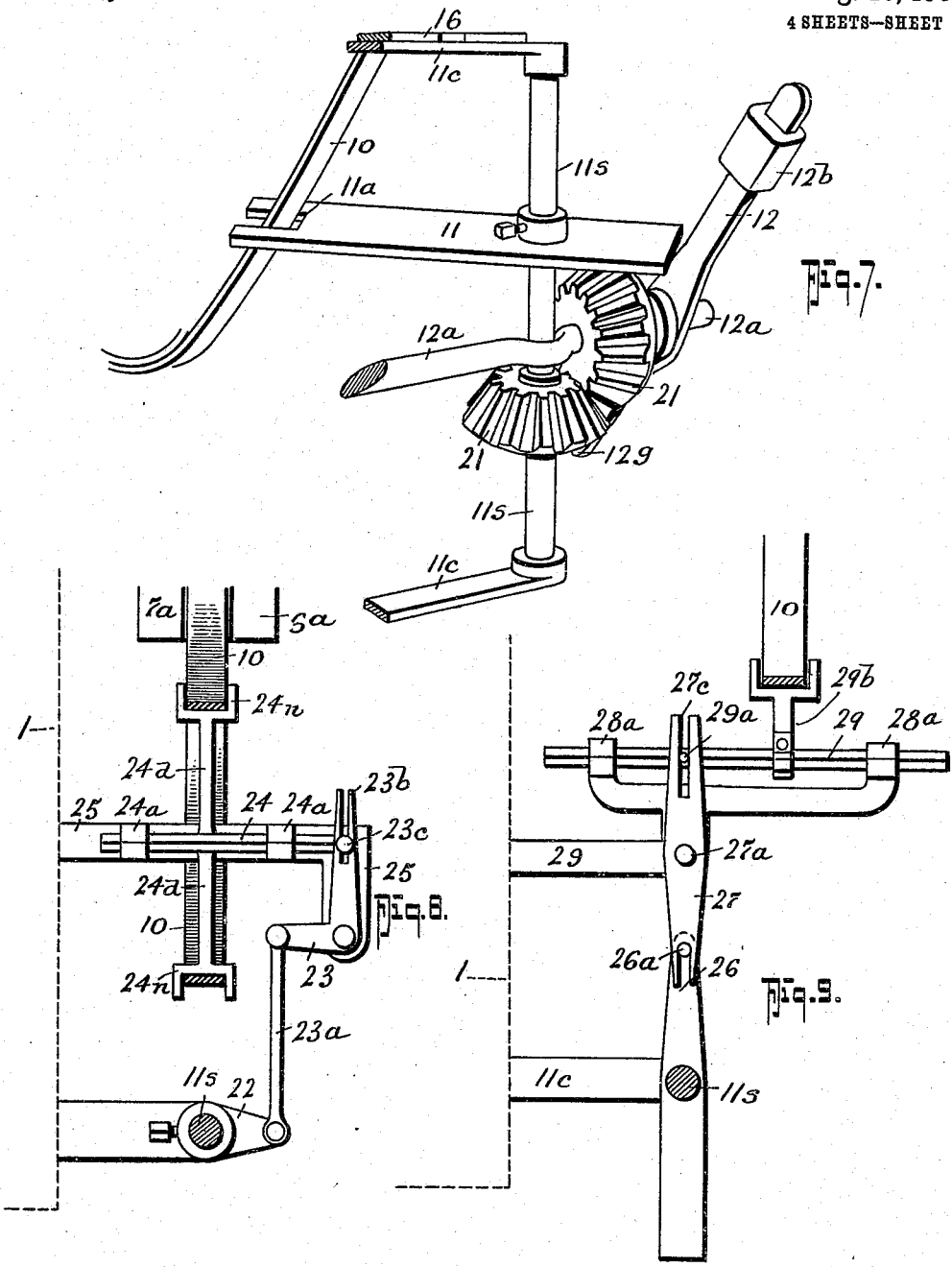

UNITED STATES PATENT OFFICE.

CHRISTIAN JENSEN, OF PALMYRA, NEW JERSEY.

DRIVE MECHANISM.

No. 930,861.          Specification of Letters Patent.          Patented Aug. 10, 1909.

Application filed November 27, 1908. Serial No. 464,582.

*To all whom it may concern:*

Be it known that I, CHRISTIAN JENSEN, residing at Palmyra, in the county of Burlington and State of New Jersey, have invented certain new and useful Improvements in Drive Mechanisms, of which the following is a specification.

My invention is a means for driving the rotary cylinders of washing machines of the type disclosed in my copending application filed December 18, 1907, Ser. No. 405,948. In washing machines of the type disclosed in such application the cylinder is revolved a predetermined number of revolutions first in one direction and then the other, thus making it desirable to have some positively operated power transmission mechanism whereby power may be taken from a uni-directionally rotatable driving shaft set in motion by a uni-directionally moving belt or other transmission device, and means whereby such power can be applied to operate the cylinder and cause it to rotate a predetermined number of times first in one direction and then a corresponding number of times in an opposite direction.

My present invention therefore primarily has for its object to provide a drive mechanism for the cylinder operated from a main power shaft (not shown) by an endless belt that moves in one direction only, and to provide means for automatically shifting the operative connection between said belt and the cylinder shaft so that without changing the direction of movement of the belt the cylinder shaft after being revolved in one direction a given number of revolutions, will be automatically reversed and revolved a corresponding number of revolutions in the opposite direction. I accomplish the foregoing result by providing a driving shaft geared directly to the cylinder shaft and carrying a main belt pulley; a second pulley is rotatable on the driving shaft; which second pulley is indirectly geared to the cylinder shaft through an idler pinion; a loose pulley is provided on the driving shaft between the other two pulleys and the endless drive belt passes around a pulley on the main power shaft and around one or another of the three pulleys on the driving shaft. A belt shifter is provided to shift the belt from one pulley to the other, as desired, and automatic means are provided to coöperate with the belt shifter to cause it to shift the belt at predetermined times so that after the belt has run on one pulley to revolve the cylinder in one direction a given number of revolutions, it will be automatically shifted to another pulley to reverse the direction of movement of the cylinder an equivalent number of revolutions.

Another object of my invention is to provide a drive mechanism of the foregoing character of a very simple construction that can be manufactured at a minimum expense and which will readily and effectively accomplish its desired purpose.

In its more specific nature my invention also embodies those novel details of construction, combination and arrangement of parts, all of which will be first described in detail and then be specifically pointed out in the appended claims, reference being had to the accompanying drawings, in which:—

Figure 1, is a perspective view showing my invention in use, the parts being in the position they assume while the cylinder is being revolved in one direction and is just about to be reversed. Fig. 2, is a similar view, the parts being in the position they assume when the cylinder is turning in an opposite direction and just about to be reversed. Fig. 3, is a similar view the reversing mechanism being in a mid-position with the belt on the loose pulley. Fig. 4, is a side elevation and part section of my invention. Fig. 5, is a top plan view. Fig. 6, is a perspective view of the oscillating bar and its rocking wedge carrying arms. Figs. 7, 8 and 9, are detail views of modifications of my invention hereinafter specifically referred to.

Referring now to the accompanying drawings in which like letters and numerals of reference indicate like parts in all of the figures, 1 represents the casing of a washing machine within which the cylinder 2 rotates. The cylinder 2 has a shaft $2^a$ which constitutes the driven shaft that is mounted in bearings in the end walls of the casing 1. A master gear 3 and pinion 4 are keyed on the projecting end of the shaft $2^a$ to turn therewith.

In suitable bearings $5^a$ of a frame 5 that is secured to the casing head $1^a$ is a driving shaft 6 to which a pulley $6^a$ is secured, so that the pulley $6^a$ and shaft 6 will turn together. A pinion $6^b$ is keyed to the shaft 6 to mesh directly with the master gear 3 on the cylinder or driven shaft $2^a$, so that, as motion is imparted to the shaft 6, in a given direction, its motion is directly transmitted to the cylinder shaft to turn the cylinder in one direction. A second pulley 7ª having a hub 7 is mounted loosely on the shaft 6 and the second pulley 7ª carries a gear 7ᵇ that meshes with the idler pinion 8ᵇ on a stub shaft 8, which is secured at 8ª to the cylinder head 1ª, as clearly shown in Fig. 4. The pinion 8ᵇ also meshes with the master gear 3 on the cylinder shaft 2ª, so that as the pulley 7ª is turned in a given direction, its motion will be indirectly imparted to the cylinder shaft to cause the cylinder shaft to turn in the same direction as the pulley 7ª when power is applied to turn the pulley 7ª in such given direction. Disposed between the pulleys 6ª—7ª on the shaft 6, is a loose pulley 9, the three pulleys lying close together so that an endless driving belt 10 may be readily shifted from one pulley to another. A uni-directionally movable driving belt 10 passes around the pulleys 6ª—7ª and 9 and around a pulley on a power shaft, (not shown).

From the foregoing it will be seen that while the belt is on the pulley 6ª, the cylinder will be turned in one direction and while the belt 10 is on the pulley 7ª, an opposite rotation will be imparted to the cylinder. When the belt 10 is on the pulley 9, no motion is applied to the cylinder.

In order to insure the proper reversal of the cylinder after a predetermined number of revolutions in one direction or another, I have devised an automatically controlled and actuated belt shifting mechanism controlled from the cylinder shaft whereby after the cylinder is moved a certain definite number of revolutions in one direction, it is automatically reversed and caused to make the same number of revolutions in the opposite direction. I may accomplish the result by providing a belt shifter 11 forked at 11ª to straddle the belt 10. The shifter 11 is a bar that is adjustably fastened to a vertical rock shaft 11ˢ that is mounted in bearings in brackets 11ᶜ that project from the head 1ª of the casing 1 so that the shifter 11 may have a rocking or pivotal movement. A bar 20 is also secured to the vertical rock shaft 11ˢ for a purpose presently to appear.

Pivoted on a stud 12ª that projects from the casing head 1ª is an oscillatable lever 12 that carries a weight 12ᵇ (preferably adjustable) to move the bar from its perpendicular position to its limit of movement at one side of its perpendicular, or the other, as the case may be. The bar 12 has arms 12ᶜ that carry wedges at their extremities to engage the shifting bar 20; one wedge engages said bar at one side of its pivot, so that when the bar 12 is in one position, one wedge 12ᵈ will have moved the belt shifter in one direction, while when the bar 12 is in an opposite position the other wedge 12ᵈ will move the belt shifter 11 into another position, and when the bar 12 is vertically disposed then the belt shifter will be held in a central position to leave the belt 10 on the loose pulley 9.

In order that the oscillating bar 12 may be moved from a position at one limit of its movement, to that at the opposite limit of its movement, I provide means actuated from the cylinder shaft 2ª to move the said bar 12 to a point beyond its vertical or "dead center" position to allow the weight 12ᵇ to move the bar 12 the remaining distance. This result is accomplished by providing a gear 13 on a stub shaft 13ª to mesh with the pinion 4 on the cylinder shaft. The gear 13 has one or more trip pins 13ᵇ—13ᶜ to engage the bottom end 12ᵍ of the bar 12, at predetermined times to move the bar from one position to another.

Operation: Assume the belt to be traveling always in one direction, say the direction of the arrow A, in Fig. 1, of the drawings, and the parts to be in the position shown in Fig. 1. The cylinder is rotating in the direction of the arrow B in Fig. 1, and has just about completed the required number of revolutions in such direction. The belt is now on the pulley 6ª and the direct drive from the driving shaft 6 to the cylinder shaft is in action. The pin 13ᵇ is just beginning to engage the bar 12 to move it from the position shown in Fig. 1, to that shown in Fig. 3. As the bar is moved by the pin 13ᵇ, the free wedge 12ᵈ in Fig. 1, engages the shifting bar 20 to work the shaft 11ˢ and the shifting bar 11 to move the belt from the pulley 6ª toward the pulleys 9 and 7ª respectively, the belt running on the pulley 9ª by the time the mid-position of the bar 12 (see Fig. 3) is reached. As soon as the bar 12 passes the mid-position, shown in Fig. 3, and drops to the position shown in Fig. 2, the belt will be on the pulley 7ª. As soon as the belt 10 gets on the pulley 7ª the indirect drive from the driving shaft to the cylinder shaft is brought into play, and the rotation of the cylinder shaft is reversed. The cylinder shaft then turns in the direction of the arrow $b$ in Fig. 2. The reversal of the cylinder shaft 2ª causes a reversal of the gear 13 which, as soon as the shaft 2ª has run its required number of revolutions in the reversed direction, will have turned back to the position shown in Fig. 2, so that the pin 13ᶜ will engage the bar 12 and carry it again beyond its mid-position to again move the belt shifter 11 to shift the belt back onto the pulley 5ª and cause the cylinder to again turn in its first direction. The change of rotation takes place at positive, regular intervals during the operation of the machine *ad infinitum.* Stops 14—15 may be provided to limit the oscillatory movement of the bar 12. By holding the bar 12 in the position shown in Fig. 3, the machine is brought to rest. The bar 12 may be sustained in a mid-position by a forked latch bar 16, longitudinally movably supported in the casing 1, or any other desirable means may be provided to hold the bar 12 in the mid-position.

In Fig. 7 I have shown how the movement of the oscillating bar 12 may be imparted to the rock shaft 11$^s$ through the medium of beveled gears 21.

In Fig. 8, I have illustrated another modification which may be used either with the beveled gear connection between the oscillating bar 12 and the rock shaft 11$^s$ that is shown in Fig. 7, or with the wedge connection between such parts shown in Fig. 1. In the form shown in Fig. 8, a crank 22 is mounted on the rock shaft 11$^s$ to turn therewith and the motion of the crank 22 is imparted to a bell crank lever 23 by a rod 23$^a$, the bell crank lever having a slotted end 23$^b$ to straddle a pin 23$^c$ on a longitudinally movable rod 24 mounted in bearings 24$^a$ in a suitable support 25, the rod 24 having arms 24$^d$ provided with fingers 24$^n$ to embrace the drive belt. In this form the support 25 and its carried parts is projected between the belt so that a double engagement with the belt is had.

In Fig. 9 I have disclosed a modification of the structure shown in Figs. 7 and 8, wherein a bar 26 has a pivot 26$^a$ that enters a fork in a lever 27, the lever 27 being fulcrumed at 27$^a$ on a bracket 29. The lever 27 has a forked end 27$^c$ to engage a pin 29$^a$ on a rod 29 that carries the belt shifting arm 29$^b$, as shown, and is mounted in bearings 29$^a$, as indicated.

Various other modifications will be readily apparent to those skilled in the art to which the invention appertains.

When I speak of direct gear connections between two parts, I mean that a gear on one part meshes directly with a gear on the other part, or a pulley on one part receives a belt that passes directly over a pulley on the other part, so that the two parts turn in opposite directions, or the equivalent of such structure, and when I speak of indirect gear connections between two parts I mean that a gear on one part connects with a gear on the other part, not by direct contact but through the medium of other gears to constitute a train of gears, or the equivalent thereof.

From the foregoing description, taken in connection with the accompanying drawings, it is thought the complete construction, operation and numerous advantages of my invention will be readily understood by those skilled in the art to which the invention appertains, and I desire it understood that slight changes in the details of construction, combination and arrangement of parts may be made without departing from the spirit of the invention, or the scope of the appended claims.

What I claim is:

1. In a drive mechanism for rotary cylinder washing machines, a cylinder shaft, a single uni-directionally movable driving belt, operative connections between the cylinder shaft and the belt whereby the movement of the belt is imparted to the cylinder shaft, means for shifting the belt with relation to the operative connection between the belt and the cylinder shaft to cause the cylinder shaft to rotate first in one direction and then in the opposite direction, said shifting means comprising a rock shaft, a belt shifter connected therewith, an oscillatable member, operative connections between the oscillatable member and the rock shaft, and means actuated directly from the cylinder shaft for engaging said oscillatable member to oscillate the same.

2. In a drive mechanism for rotary cylinder washing machines, a cylinder shaft, a single uni-directionally movable driving belt, operative connections between the cylinder shaft and the belt whereby the movement of the belt is imparted to the cylinder shaft, and means for shifting the belt with relation to the operative connection between the belt and the cylinder shaft to cause the cylinder shaft to rotate first in one direction and then in the opposite direction, said shifting means comprising a rock shaft, a belt shifter connected therewith, an oscillatable member, connections between the oscillatable member and the rock shaft, and means actuated directly from the cylinder shaft for engaging said oscillatable member to oscillate the same, said last named means comprising an idler gear, a pinion on the cylinder shaft meshing with the idler gear, and means carried by the idler gear for engaging the oscillatable member as the idler gear is rotated by the movement of the cylinder shaft.

3. In a drive mechanism for rotary cylinder washing machines, a cylinder shaft, a driving shaft, loose and fast pulleys on the driving shaft, gear connections between the driving shaft and the cylinder shaft and gear connections between the loose pulley and the cylinder shaft, a uni-directionally movable driving belt coöperating with said pulleys, a belt shifting bar engaging the belt, and oscillatable means independent of the shifting bar for engaging said shifting bar to actuate the same, and means actuated by the cylinder shaft for effecting a part only of the oscillatable movement of said oscillatable means.

4. In a drive mechanism for rotary cylinder washing machines, a driving shaft, a cylinder shaft, direct gear connections between the driving shaft and the cylinder shaft, pulleys carried by said driving shaft, a uni-directionally movable driving belt coöperating with said pulleys, one of said pulleys being secured to the driving shaft to turn therewith, and another of said pulleys running loose on the driving shaft, indirect gear connections between the loosely running pulley and the cylinder shaft, whereby when the belt is on the first pulley a direct drive will be imparted to the cylinder shaft to turn in one direction and when the belt is on the other pulley an indirect drive will be imparted to the cylinder shaft to turn in an opposite direction, and an automatic means for shifting the belt from one pulley to the other at intervals, said shifting means comprising a shifting bar to engage the belt, an oscillatable means engaging said shifting bar to actuate the same, means controlled by rotation of the cylinder shaft for effecting a part of the oscillatable movement of said oscillatable means, and a gravity operated means carried by said oscillatable means for completing the oscillation thereof.

5. In a drive mechanism, means, including a rotatable shaft for imparting motion to an object, a shiftable member coöperating with said motion imparting means, an oscillatable bar, connections between said oscillatable bar and said shiftable member whereby when the bar is in one position the shiftable member will cause the motion imparting means to turn the object in one direction and when the bar is in an opposite position will cause the motion imparting means to effect an opposite rotation of the object, means for oscillating said bar at predetermined intervals, said last named means comprising a rotatable member connected with the rotatable shaft to be rotated thereby, and means carried by said rotatable member for engaging said bar at times.

6. In a drive mechanism for rotary cylinder washing machines, a cylinder shaft, a plurality of driving pulleys, an endless belt passing thereover, direct gear connections between one of said pulleys and the cylinder shaft and indirect gear connections between another of said pulleys and the cylinder shaft, combined with an automatic belt shifter for shifting the belt from one pulley to another at predetermined intervals, said belt shifter comprising a pivoted bar to engage the belt, a weighted oscillatable bar having means for engaging said pivoted bar to rock it on its pivot, and means for moving said oscillatable bar from one position to a point just beyond its "dead center" to permit the weight to complete the oscillatable movement in a given direction.

7. In a drive mechanism for rotary cylinder washing machines, a cylinder shaft, a plurality of driving pulleys, an endless belt passing thereover, direct gear connections between one of said pulleys and the cylinder shaft and indirect gear connections between another of said pulleys and the cylinder shaft, combined with an automatic belt shifter for shifting the belt from one pulley to another at predetermined intervals, said belt shifter comprising a pivoted bar to engage the belt, a weighted oscillatable bar having means for engaging said pivoted bar to rock it on its pivot, and means for engaging said oscillatable bar to effect a portion of its oscillatable movement at predetermined intervals.

8. In a drive mechanism for rotary cylinder washing machines, a cylinder shaft, an endless belt, a set of pulleys around which said belt passes, direct gear connections between one of said pulleys and the cylinder shaft and indirect gear connections between another of said pulleys and the cylinder shaft, a pivoted bar to engage said belt for shifting the same from one pulley to another, an oscillatable bar having arms provided with means to engage said pivoted bar, one of said last named means serving to move the pivoted bar when the oscillatable bar is in one position and another of said means adapted to move the pivoted bar in an opposite direction when the oscillatable bar is in an opposite position, and means for effecting an oscillation of said bar.

9. In a drive mechanism for rotary cylinder washing machines, a cylinder shaft, an endless belt, a set of pulleys around which said belt passes, direct gear connections between one of said pulleys and the cylinder shaft and indirect gear connections between another of said pulleys and the cylinder shaft, a pivoted bar to engage said belt for shifting the same from one pulley to another, an oscillatable bar having arms provided with means to engage said pivoted bar, one of said last named means serving to move the pivoted bar when the oscillatable bar is in one position and another of said means adapted to move the pivoted bar in an opposite direction when the oscillatable bar is in an opposite position, mechanical means for effecting a portion of the oscillatable movement of said bar and gravity actuated means for completing said oscillatable movement.

10. In a drive mechanism for rotary cylinder washing machines, a cylinder shaft, an endless belt, a set of pulleys around which said belt passes, direct gear connections between one of said pulleys and the cylinder shaft and indirect gear connections between another of said pulleys and the cylinder shaft, a pivoted bar to engage said belt for shifting the same from one pulley to another, an oscillatable bar having arm provided with means to engage said pivoted bar, one of said last named means serving to move the pivoted bar when the oscillatable bar is in one position and another of said means adapted to move the pivoted bar in an opposite direction when the oscillatable bar is in an opposite position, mechanical means for effecting a portion of the oscillatable movement of said bar, gravity actuated means for completing said oscillatable movement, and means connecting said mechanical means with said cylinder shaft whereby the mechanical means is actuated from the cylinder shaft.

11. A drive mechanism comprising a driving shaft, a plurality of pulleys mounted thereon, a driving belt for said pulleys, a driven shaft, direct gear connections between one of said pulleys and the driven shaft, and indirect gear connections between another of said pulleys and the driven shaft, an oscillatable bar, a fixed pivot for said oscillatable bar a belt shifter, connections between the bar and the belt shifter for actuating the belt shifter, and means operated from the driven shaft for imparting a slow movement to said bar during a portion of its oscillation and a rapid motion during another portion of its oscillation.

12. A drive mechanism comprising a driving shaft, a plurality of pulleys mounted thereon, a driving belt for said pulleys, a driven shaft, direct gear connections between one of said pulleys and the driven shaft, and indirect gear connections between another of said pulleys and the driven shaft, an oscillatable bar, a fixed pivot therefor a belt shifter, connections between the bar and the belt shifter for actuating the belt shifter, and means actuated from the driven shaft for imparting a slow movement to the oscillatable bar during a portion of its oscillation, and other means for rapidly completing the oscillatable movement of said bar.

13. A drive mechanism comprising a driving shaft, a plurality of pulleys mounted thereon, a driving belt for said pulleys, a driven shaft, direct gear connections between one of said pulleys and the driven shaft, and indirect gear connections between another of said pulleys and the driven shaft, an oscillatable bar, a fixed pivot therefor a belt shifter, connections between the bar and the belt shifter for actuating the belt shifter, and means actuated from the driven shaft for imparting a slow movement to the oscillatable bar during a portion of its oscillation, and other means for rapidly completing the oscillatable movement of said bar, said other means comprising a weight carried by the bar.

14. A drive mechanism comprising a driven shaft, a pulley or driving shaft, driving pulleys mounted on said driving shaft, gearing connecting certain of said pulleys with the driven shaft, a driving belt for said pulleys, a rock shaft, a belt shifter bar adjustably mounted on said rock shaft to engage said belt, an oscillatable bar, operative connections between the oscillatable bar and the rock shaft for imparting the movement of the bar to the rock shaft, and means for imparting a slow movement to said oscillatable bar during a portion of its oscillation and a rapid motion to the oscillatable bar during the remainder of its oscillatable movement.

15. A drive mechanism comprising a driven shaft, a pulley or driving shaft, driving pulleys mounted on said driving shaft, gearing connecting certain of said pulleys with the driven shaft, a driving belt for said pulleys, a rock shaft, a belt shifter bar adjustably mounted on said rock shaft to engage said belt, an oscillatable bar, operative connections between the oscillatable bar and the rock shaft for imparting the movement of the bar to the rock shaft, and means for partly moving said oscillatable bar in one direction or the other at a slow speed and other means for completing the movement at a rapid speed.

CHRISTIAN JENSEN.

Witnesses:
CHARLES LOWELL HOWARD,
A. E. DIETERICH.